May 21, 1940.   J. KUNA   2,201,792
COVERED SLIDING CLASP FASTENER
Filed Nov. 5, 1938   2 Sheets-Sheet 1
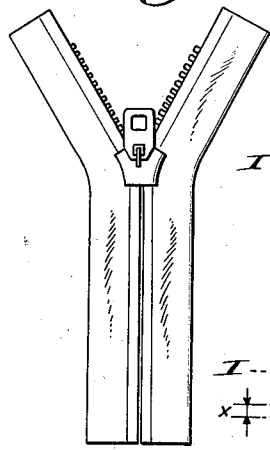
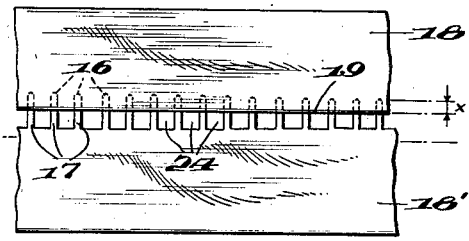
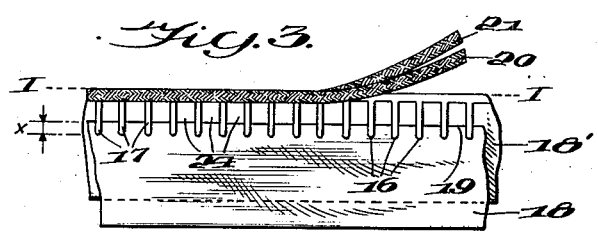
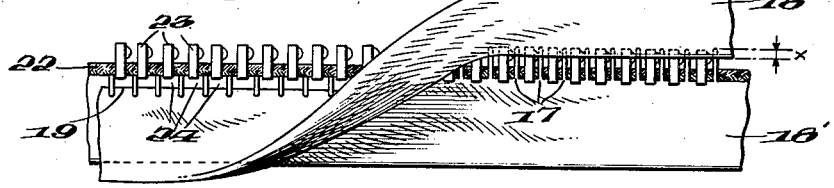
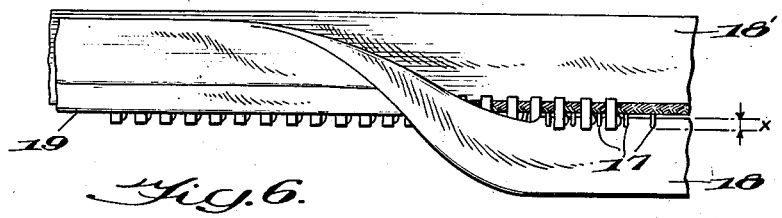
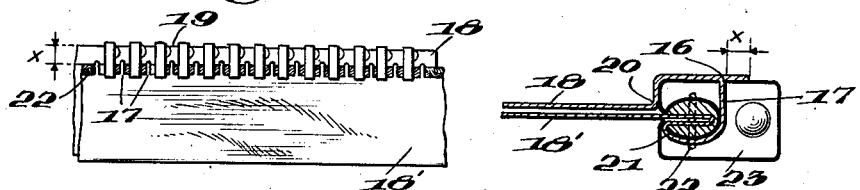
Inventor:
Josef Kuna,
By Potter, Pierce + Scheffler,
Attorneys.

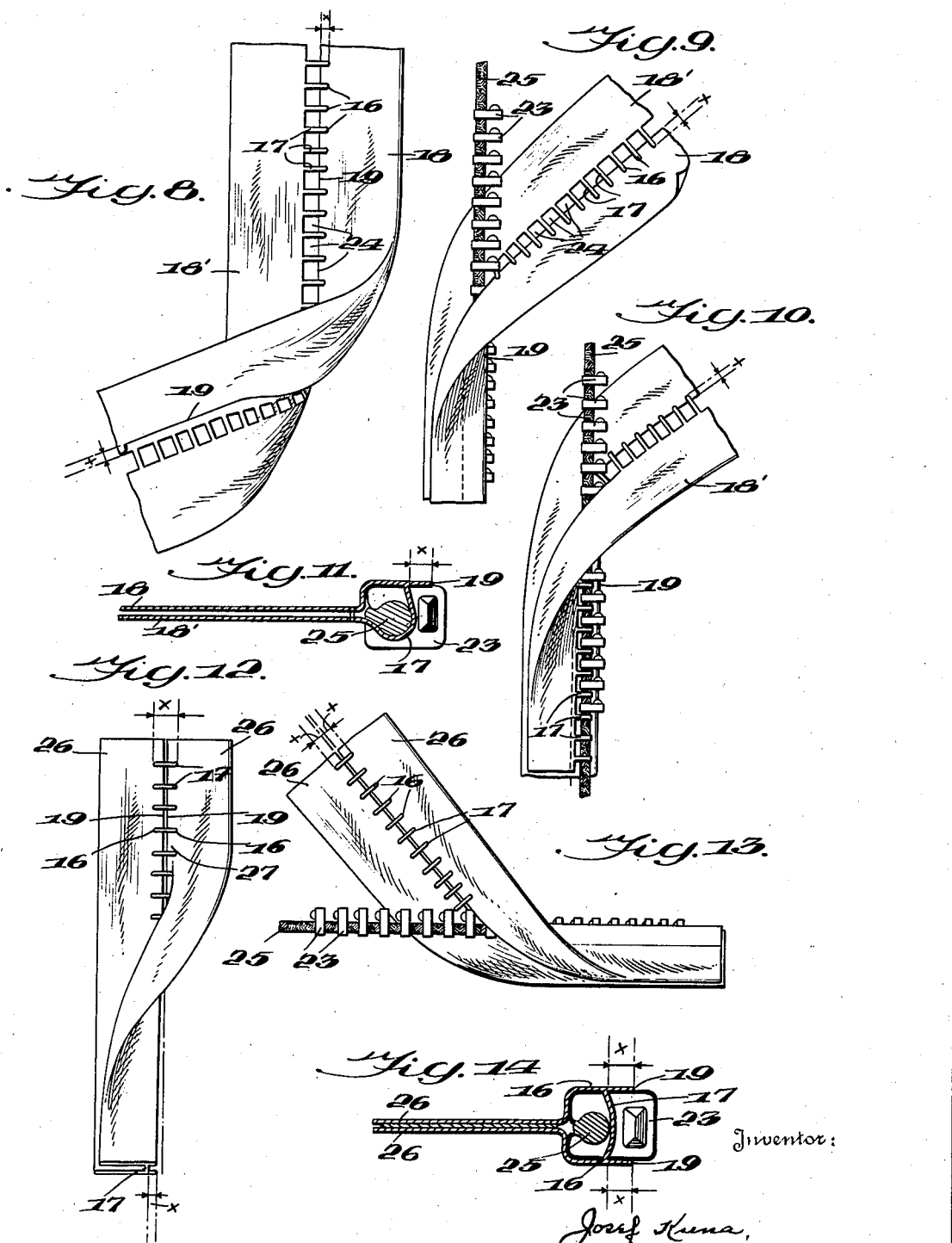

Patented May 21, 1940

2,201,792

UNITED STATES PATENT OFFICE 2,201,792

COVERED SLIDING CLASP FASTENER

Josef Kuna, London, England

Application November 5, 1938, Serial No. 239,131
In Czechoslovakia September 9, 1938

12 Claims. (Cl. 24—205)

The invention relates to separable fasteners and particularly to separable fasteners provided with flexible covering members for the fastener elements.

It is a primary object of the invention to provide a covered slide operated fastener in which the elements of the cover members will lie perfectly flat when the fasteners are in service and which will be easy to manufacture and durable in service.

Another object of the invention is to provide a novel mounting tape for slide fasteners which may serve not only as the cover member for the fastener elements but which may also serve as the carrier member on which the individual fastener elements are mounted.

Slide fasteners with covered elements have been proposed, but have not proven satisfactory because of defects arising in use of the fastener or manufacturing difficulties which render them impractical. One such form consisted in a cover portion either integral with or applied over a carrier member in which a portion of the strip covered the fastener elements and was sewn in position by stitches extending between the fastener elements and also between a portion of the cover member and the carrier strip. In such a construction and variations thereof the slider moving over the fastener soon wears the stitches out rendering the fastener unsightly and practically useless. Furthermore, special machines had to be employed for the sewing operation after assembly of the fasteners on the carrier. Other covered fasteners have been proposed in which a cover member is formed with a doubled over portion providing a projecting seam extending over the fasteners. However such constructions have the disadvantage that they are bulky and do not lie flat in addition to having stitches which are exposed to wear by the slider.

The present invention solves the problems incident to the production and use of a covered slide fastener by novel means, the objects of the invention being achieved in a simple and economical manner in a structure in which the fastener elements may be of usual form and attached in position by conventional means and in which sewing between the fasteners, doubled seams and other objectionable features are avoided. These desirable and novel results are achieved by the employment of a novel form of band or tape, forming part of the invention, which may serve both as a carrier and cover strip, and by a novel method of making the stringers of the fastener employing the new band.

Other objects and advantages of the invention will become apparent from the following detailed description and upon reference to the accompanying drawings which illustrate preferred examples of the invention and in which:

Fig. 1 is a plan view of a covered separable fastener embodying the invention,

Fig. 2 is a plan view of a novel band or mounting tape forming part of the invention, Figs. 3, 4 and 5 are plan views showing steps in the manufacture of one-half of a separable fastener according to the invention, Fig. 6 is a plan view of the back of a finished stringer, Fig. 7 is a cross section through one-half of a completed fastener, Fig. 8 is a plan view showing both sides of the band employed in the invention, Fig. 9 is a plan view from the front of a step in the manufacture of a modified form of the invention, Fig. 10 is a view from the back thereof, Fig. 11 is a cross section through one-half of the completed modified fastener, Fig. 12 is a combined plan and end view of a modified form of band or mounting tape, Fig. 13 is a view illustrating a step in the manufacture of half of a fastener employing the tape of Fig. 12, and Fig. 14 is a cross section through the modified half of the fastener of Fig. 13.

One of the embodiments according to the invention is shown in Figures 1 to 7. Figure 1 shows a finished fastener, and Figure 2 a carrier band or tape in accordance with the invention and similar to an open-work fabric. From this latter, however, it differs substantially in that the connection formed by the aid of small columns of material 17 between the adjacent sides of the bands or strip portions 18, 18' is designed in such a way that the said columns connecting the two sides of the bands 18, 18' are attached to one of them (18 in Figure 2) at the distance $x$ from the edge of said band, which implies that the entire band, formed by weaving, or in like manner, issues from the machine as a unit, whilst the weft threads attach themselves to the band 18 at points 16 situated at a distance $x$— according to the circumstances and the size of the fastener—from the edge of the band. In this manner a perforated band is produced, the one edge of which covers the points 16 where it is attached to the other part of the band with the aid of the columns 17. In order to make a fastener, the operations proceed as follows: The band of Figure 2 is turned over, through 180°, round the axis I—I, whereupon two cords 20—21—one on either side—are sewn on to the band 18' at a point on the fold, a little below the edge I—I (Figure 3), according to the size of the fastener. The seam is marked 22. Figure 4 shows the next stage of the process, from which it appears that the usual component members 23 are pressed into intermediate spaces 24 (formed in the production of the band), in the finished band as shown in Figure 3, by means of the usual tools. The other side (18) of the band is then folded over the component members in such a manner that the pillars 17 come into position exactly between the members 23; and the band 18' is laid on the band 18, so that the portion of the band 18, which extends for the distance x, in front of the point of attachment 16 of the columns 17, covers the closing members perfectly, without any seam being required. All that is now needed for turning out a finished product is to connect the two ends of the bands 18, 18' together—for example with an adhesive,—though this is not essential, inasmuch as the two bands are united by the act of attaching them to the garment. Figure 5 shows the aforesaid folding of the part 18 over the part 18'.

Figures 8–11 show a modification consisting in the employment of a cord 25 on to which the members 23 are pressed in the usual manner, whereupon, the product obtained in this manner is assembled with the tape comprising the strip portions 18, 18' (Figure 8) which has the same construction as the tape of Fig. 2. This assembly disposes the fastener elements 23 in the spaces 24 with the ends thereof projecting beyond connecting columns 17. The part 18 is then folded down onto the elements 23 and the part 18', as shown in Figure 9, the two parts being then connected together in any convenient way.

An embodiment will now be described in which, in contrast to the preceding embodiments—which related to a fastener covered on the upper side only—both sides are covered. The production of this fastener is just as simple as the other, and differs from that shown in Figures 8–11, solely in that the band or mounting tape is constructed as shown in Figure 12. Said band 26 is perfectly symmetrical in relation to the longitudinal axis II—II, so that each of the sides or strip portions 26 of this embodiment (Figure 12) actually corresponds to the part 18 of Figures 2 and 8, disposed symmetrically about the axis II—II. The extent x of the covering, that is distance between the edge of the strips and the points 16 of attachment of the connecting members 17 to the face thereof depends—as in the case of the preceding embodiments—on the size of the fastener. A carrier cord or strip 25 with a plurality of fastener elements 23 mounted thereon in the usual manner is assembled with the tape shown in Fig. 12 in the manner shown in Fig. 13 with the ends of the fasteners passing through the spaces between the elements 17 and pressing the strips apart in the areas 27 so that the ends of the fastener elements project beyond the connecting elements. The strip portions 26 are then brought into superposed relation on opposite sides of the fastener elements 23 as shown in Figures 13 and 14. The parts of the strips 26 in back of the fastener elements may be secured together as desired.

As will be evident from the three embodiments of the subject of the invention, the invention relates to an entirely novel method of producing covered sliding-clasp fasteners, by simple technical means, a perfect, sightly and inexpensive product being obtained without the necessity for using any special devices in its production. It is needless to say that even the very finest types of covered sliding-clasp fasteners can be produced in this manner.

I claim:

1. A mounting tape for fastener elements comprising two strip portions having continuous adjacent edges in spaced relation, said strip portions being connected by an intermediate open work portion having slat elements joined at opposite ends to said strip portions, the points of connection of said slat elements with one of said strip portions being on one face thereof along a line spaced from the continuous edge thereof adjacent the open work portion.

2. A stringer for fastening devices of the character described comprising a tape including two strip portions having continuous adjacent edges, said strip portions being joined by an integral intermediate slatted open work portion, fastening elements having interlocking end portions extending through the openings of said open work portions, the slat elements of said open work portion being joined to the face of one of said strip portions along a line spaced from the edge thereof adjoining the open work portion.

3. A stringer for multiple interlocking fasteners including a tape comprising two single thickness strip portions joined by a plurality of spaced connecting elements forming a series of longitudinally spaced openings, fastener elements having interlocking end portions extending through said openings, one of said strip portions having a continuous marginal portion overlying one side face of said fastener elements and said spaced connecting elements being joined to the face of said last mentioned strip portion along a line spaced from the longitudinal edge of said marginal portion overlying said fastener elements.

4. In a stringer for fastening elements of a slide operated fastener, a combined mounting and cover member comprising a tape including two strip portions joined by a plurality of connecting elements forming an intermediate open work portion, fastener elements secured along the edge of one of said strip portions adjacent said open work portion and projecting beyond said edge between said connecting elements of said open work portion, the other strip portion overlying one side face of said fastener elements and having a continuous marginal portion covering at least a portion of the projecting ends thereof, the connecting elements of said open work portion being joined to said last mentioned strip portion along a longitudinal line spaced inwardly from the edge of said marginal portion overlying said projecting end portions of said fastener elements.

5. In a stringer for fastening elements of a slide operated fastener, a combined mounting and cover member comprising a tape including two strip portions joined by a plurality of connecting elements forming an intermediate open work portion, a bead provided along the edge of one of said strip portions adjacent said open work portion, fastener elements secured to and spaced longitudinally along said bead and projecting therebeyond through the spaces between the elements of said open work portion, the other strip portion overlying one side face of said fastener elements and having a continuous marginal portion projecting beyond the line of said bead to cover at least a portion of the projecting ends of said fastener elements, the connecting elements of said open work portion of said tape being joined to said last mentioned strip portion along a longitudinal line spaced inwardly from the edge of said marginal portion overlying said projecting end portions of said fastener elements.

6. In a slide operated fastener comprising rows of multiple interlocking fastener elements and a slider movable along said elements for engaging and disengaging the same, cover members for the fastening elements of each row, each cover member comprising a one piece woven tape including two single thickness elongated strip portions spaced by an elongated open work portion providing a series of longitudinally spaced openings, fastening elements having interlocking end portions extending through said openings, one of said strip portions overlying one side face of said fastening elements and having a continuous marginal portion covering at least a portion of the projecting ends thereof and said open work portion being joined to said last mentioned strip portion along a longitudinal line spaced inwardly from the edge of said marginal portion.

7. A stringer for multiple interlocking fasteners including a tape comprising two single thickness strip portions joined by a plurality of spaced connecting elements forming a series of longitudinally spaced openings, an elongated carrier member, fastener elements secured along the length of said carrier member and extending through the openings between said connecting elements, one of said strip portions overlying one side face of said carrier member and having a continuous marginal portion covering at least a portion of the projecting ends of the fastener elements secured thereto and said spaced connecting elements being joined to the face of said last mentioned strip portion along a line spaced from the edge of said marginal portion overlying said fastener elements.

8. In a slider operated fastener comprising rows of multiple interlocking fastener elements and a slider movable along said elements for engaging and disengaging the same, a cover strip for the fastening elements of each row comprising a tape including two elongated strip portions having continuous adjacent edges, said strip portions being spaced by an elongated open work portion providing a series of longitudinally spaced openings through which said fastener elements project, said strip portions overlying opposite faces of said fastener elements and said open work portion being joined to the opposed faces of said strip portions along longitudinal lines spaced inwardly from the said continuous adjacent edges thereof.

9. In a slider operated fastener comprising rows of multiple interlocking fastener elements and a slider movable along said elements for engaging and disengaging the same, a cover strip for the fastening elements of each row comprising a one piece woven tape including two single thickness elongated strip portions having continuous adjacent edges, said strip portions being spaced by an elongated open work portion providing a series of longitudinally spaced openings through which said fastener elements project, said strip portions overlying opposite sides faces of said fastener elements and said open work portion being joined to the opposed faces of said strip along longitudinal lines spaced inwardly from the adjacent edges thereof.

10. In a slider operated fastener comprising rows of interlocking fastener elements and a slider movable along said elements for engaging and disengaging the same, an elongated carrier member having fastener elements attached thereon in longitudinally spaced relation, a cover strip for the fastener elements of each row comprising a tape including two elongated strip portions having continuous adjacent edges, said strip portions being spaced by an elongated open work portion providing a series of longitudinally spaced openings through which said fastener elements project, said strip portions overlying opposite side faces of said rows of fastener elements and enclosing the carrier member, and said open work portion being joined to the confronting faces of said strip portions along longitudinal lines spaced inwardly from the edges thereof which overlie the projecting portions of said fastener elements.

11. A mounting tape for fastener elements comprising two single thickness strip portions having continuous adjacent edges of single thickness in spaced relation, said strip portions being connected by an intermediate open work portion having slat elements joined at opposite ends to said strip portions, the points of connection of said slat elements with at least one of said strip portions being on one face thereof along a line spaced from the continuous single thickness edge thereof adjacent the open work portion.

12. A stringer for multiple interlocking fasteners including a tape comprising two strip portions joined by a plurality of spaced connecting elements forming a series of longitudinally spaced openings, fastener elements having interlocking end portions extending through said openings, one of said strip portions overlying one side face of said fastener elements and having a continuous longitudinal single thickness marginal portion covering the end portions of said fastener elements, said spaced connecting elements being joined to the face of said last mentioned strip portion along a line spaced from the edge of said marginal portion.

JOSEF KUNA.